United States Patent [19]

Songer

[11] Patent Number: 5,153,620
[45] Date of Patent: Oct. 6, 1992

[54] PROCESS FOR PROCESSING MOTION PICTURE FILM TO REDUCE STROBING

[75] Inventor: Jimmie D. Songer, Burleson, Tex.

[73] Assignee: Magma, Inc., Ft. Worth, Tex.

[21] Appl. No.: 643,575

[22] Filed: Jan. 18, 1991

[51] Int. Cl.⁵ .................... G03B 19/18; G03B 21/32
[52] U.S. Cl. ...................................... 352/38; 352/44; 352/46; 352/85; 352/87
[58] Field of Search .................. 352/44, 46, 85, 86, 352/87, 38

[56] References Cited

U.S. PATENT DOCUMENTS 1,627,976  5/1927  Knechtel .
1,815,455  7/1931  Waller .
1,952,340  3/1934  Spivack .
3,511,567  5/1970  Dejoux .
4,889,423  12/1989  Trumbull .

Primary Examiner—Monroe H. Hayes
Attorney, Agent, or Firm—James E. Bradley

[57] ABSTRACT

A method of creating motion picture film reduces strobing effect and increases resolution and density. Images are recorded on a first frame of the film from two frames viewed by the camera. These will be superimposed at equal exposure rates. Each frame of the processed film will have double exposures. The procedure may to be performed with photographic film and also with video tape.

3 Claims, 2 Drawing Sheets

PROCESS FOR PROCESSING MOTION PICTURE FILM TO REDUCE STROBING

BACKGROUND OF THE INVENTION

1. Field of the Invention

This invention relates in general to a method of processing motion picture film or video tape to reduce strobing effect and to increase resolution and density.

2. Description of the Prior Art

Prior to the introduction of sound to motion pictures, when it became necessary to adopt a standard frame rate to synchronize the moving image with the accompanying sound, motion pictures were hand cranked at varying frame rates, from as slow as ten frames-per-second (fps) to as high as 20 fps. At the slower frame rates almost any motion, such as walking, appeared jerky and unnatural because to wide a range of motion occurred in too few frames. The fewer frames-per-second allowed for a proportionate increase in exposure time, thus producing a higher resolution image.

One solution to this problem was offered in U.S. Pat. No. 1,815,455, issued Jul. 21, 1931, F. Waller. Waller superimposed multiple preceding and succeeding images, from as few as three to as many as five, on one frame. The preceding images and succeeding images were exposed in differing amounts less than the normal exposure time. The total of the partial exposures equalled one normal exposure. This was particularly applicable for creating motion pictures from a series of still pictures or drawings showing successive phases of action. In the time period following the filing date of the Waller patent, sound films began to appear and the problem Waller described for motion pictures was solved by the higher films speed (i.e., 24 fps) adopted as a standard for sound-synchronized film.

One problem which Waller did not address and the higher film speed did not cure was the strobing effect. The strobing effect is an undesirable optical illusion resulting from the relationship between the speed of the motion of the photographed subject and the time interval between camera exposures. The most common example is the illusion of a spoked-wheel appearing to revolve backwards when in reality it is moving forward.

A spoked-wheel rotating in a series of motion picture frames may appear in three phases: moving forward (in the direction of rotation); moving backward (opposite the direction of rotation); and standing still (no apparent rotation).

When the wheel appears to be moving forward, the position of the spokes, when photographed, has rotated more than a number of complete revolutions (i.e., 360 degrees) divided by the number of the spokes, so that the image in each succeeding frame has advanced from its position in the preceding frame.

To create the optical illusion of moving backward, the position of the spokes, as photographed, has rotated less than a number of complete revolutions divided by the number of spokes, thus the image in each succeeding frame has retrograded from its position in the preceding frame. A wheel that appears to be standing still is rotating a number of complete revolutions divided by the number of spokes, thus appearing to be in the same position in each succeeding frame. If a light-colored wheel is rotating against a dark background, each image of the wheel produces a contrasting area of brightness in the position of the image and no light (darkness) where the image is absent. The opposite would be true of a dark wheel rotating against a light background.

The higher the resolution of the spoke, the more pronounced is the strobing effect. Thus the strobing effect is more pronounced if the images overlap one another, intensifying the portion of the overlapped images, where the brightness contrast (in the case of a light wheel before a dark background) is greater.

In the early days of black and white films, fine-grained film emulsions, as slow as 5 ASA to 15 ASA, combined with slower film speeds and longer exposures, produced high-resolution images. Today, largely because of improved optics, particularly the zoom-lens, and the desire to remove film-making from the studio environment, the use of high-speed films, to 400 ASA and higher, has reduced the resolution of the image in motion pictures.

Density refers to the amount of information contained in a particular image measured by the number of individual elements comprising the total picture. The greater number of individual elements, the greater the density. Because grain structure of an emulsion is randomly distributed, the grain structure varies between individual frames. Since the amount of grain structure determines the density of the emulsion, and the thickness of the emulsion determines the film speed, the film maker must choose between high density and low speeds or low density and high speeds.

The problem of strobing and reduced resolution and intensity also occurs in video taping. In video taping, the image is electronically scanned and recorded on a medium, usually video tape. The word "film" will be used herein to refer to both photographic emulsion film and video tape.

SUMMARY OF THE INVENTION

In this invention, the first two frames of a film-negative, as photographed by a motion-picture camera, (hereinafter called the "negative") will be recorded onto the first frame of a film-positive (hereinafter called the "positive"). These two negative frames will be double-exposed onto the positive frame at approximately equal exposure rates. Each exposure rate of the negative images will be approximately one half the normal exposure for recording a single frame on a positive. Similarly, the second frame of the positive will be double-exposed from the second and third frames of the negative in a like manner as the first two frames were recorded. The procedure is repeated until the processing has been completed.

Both the positive and the negative have a plurality of frames. Light will be passed through the first frame of the negative onto the first frame of the positive. This creates a single exposure on the first frame of the positive. Then, one of the films, for this example the negative, is advanced one frame forward relative to the other. Then, light is passed through the second negative frame at approximately the same exposure rate as the previous exposure onto the first frame of the positive. This results in the first frame of the positive having double exposures from the negative, each at less than the normal exposure rate. The total exposure rate on the positive will approximate the specified or normal exposure rate.

Then, the positive will be advanced one frame forward, relative to the negative. Light will be passed through the second frame of the negative onto the second frame of the positive. Similarly, the third frame of the negative will be advanced and exposed onto the second frame of the positive. Again, a double-exposure will be created on the positive.

In the case of video tape, the video camera will scan images to continuously, electronically convey the images scanned into a plurality of frames. Each of the frames contains a plurality of electronic lines. A first frame from the video camera will be conveyed to a frame-delay circuit. The second frame from the video camera will be conveyed simultaneously to a matrix circuit and to the frame-delay circuit.

At the same time that the frame-delay circuit receives the second frame, it will convey the first frame to a matrix. The matrix is a resistive network which reduces the amplitude of the signal, which corresponds to the exposure rate, of each of the first and second frames, by approximately one-half. A mixing circuit will combine the first and second frames with each other and convey the combined signal to a recording device. The combined signal will approximately equal the voltage level or exposure rate of a normal, single frame. The recording device will record the combined signal onto the first frame of a video tape. These steps will be repeated until the video tape is processed.

DESCRIPTION OF THE PREFERRED EMBODIMENT

Figure 1:
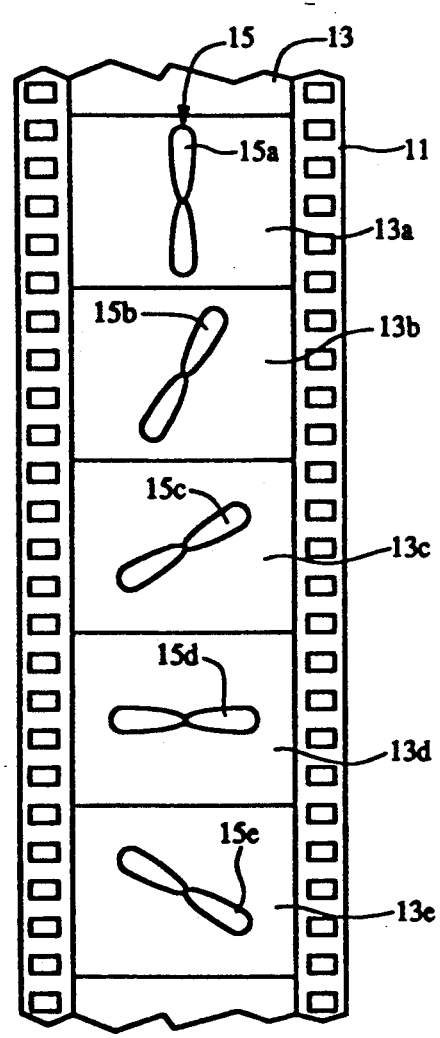
FIG. 1 is a schematic representation of a negative.
Figure 2:
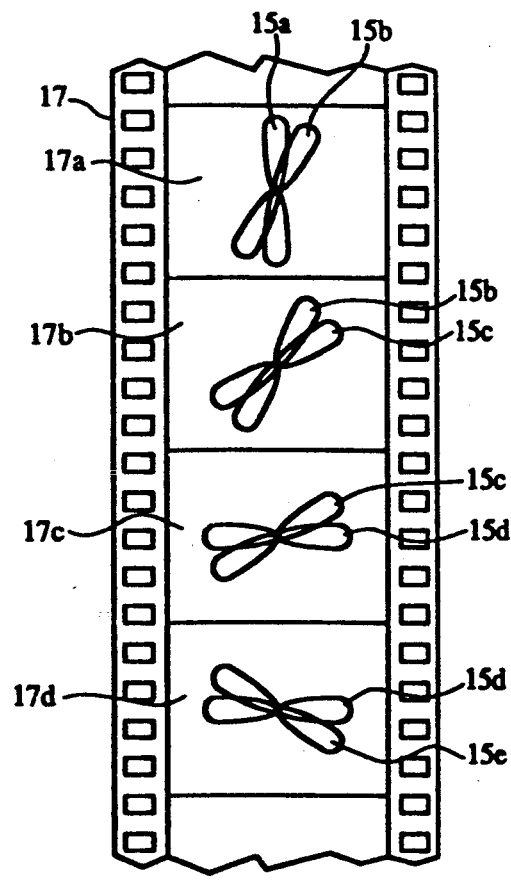
FIG 2 is a schematic representation of a positive that has been processed in accordance with this invention.

Referring to FIG. 1, a negative 11 is shown. Negative 11 has a plurality of frames 13. The first frame is designated by the numeral 13a, with the succeeding frames designated by the numerals 13b, 13c, 13d and 13d.

An image 15, illustrated as a propeller rotating clockwise, will be contained on the negative 11. Each of the frames 13a-13e contains the image 15 in a different position of rotation. Image 15 has been recorded in time sequence with a camera (not shown) and is moving in the embodiment shown. As a result, it occupies a different position in each of the frames 13a-13e. These different positions of the image 15 are referred to by the numerals 15a-15e.

Positive 17 is the film that has been created from negative 11 for viewing. Positive 17 has four frames shown, 17a, 17b, 17c and 17d. Positive 17 has been processed to reduce strobing and to increase the resolution and density. In the embodiment shown, the first frame 17a has been exposed with the images 15a and 15b. Images 15a and 15b are preferably exposed at approximately one-half the normal exposure each. In the preferred embodiment, this results in two superimposed images 15a, 15b of approximately equal exposure rate. Similarly, the second positive frame 17b contains double exposed images 15b and 15c. Third positive frame 17c contains images 15c and 15d. Fourth positive frame 17d contains images 15d and 15e.

Because the negative 11 was exposed at 24 frames-per-second, the positive 17 will have the equivalent of 48 frames-per-second of the image 15 in motion. Parts of the image 15 that are in motion will appear in two positions, rather than one, as they vary from negative frame 13a to negative frame 13e. Consequently, the image 15 will contain two areas of brightness as in the case of a light moving object against a dark background of less intensity and less resolution for each image. The dual images that exist in a frame containing motion, either of the object in motion when the camera is still, or of a still object when the camera is in motion (panning), will appear to be in more than one position. The dual images will not be as sharp, due to the partial exposure, thus reducing the sharpness of image that emphasizes the strobing effect.

At the same time, the stationary portions of the image, because of the full exposure afforded it, will show a great resolution at a greater density because of the double exposure of two of the images 15 on each frame 17a-17d. Each of the frames 17a-17d is composed of two separate grain structures containing the same static portions of image 15, one filling in where the other may be lacking. This characteristics is particularly true in color film where the upper layers containing the color pigment must be transparent for the light to penetrate to the lower layers containing a different color pigment.

Figure 3:
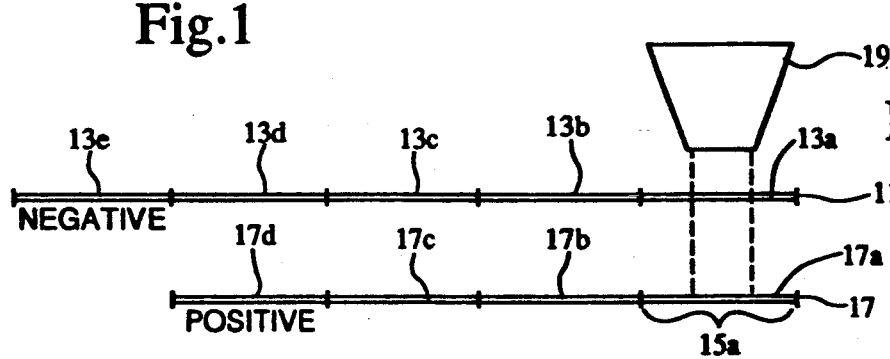
FIGS. 3-7 are schematic representations of the sequential steps taken to expose the positive of FIG. 2.

The preferred method for creating the positive 17 is illustrated in FIGS. 3-7. As shown in FIG. 3, a conventional printer lamp 19 will be provided for transmitting light through the negative 11 onto the positive 17. Depending on the type of film employing for positive 17, the light from the lamp 19 will be of a selected intensity and for a selected duration. The combination of intensity and time of exposure provides the specified exposure rate. The exposure rate can be varied by either changing the time of exposure or by changing the intensity of the light from lamp 19.

Figure 4:
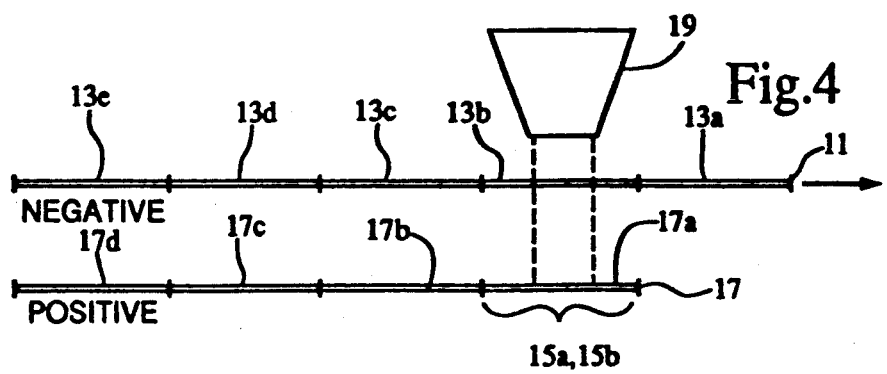

In FIG. 3, negative image 15a is shown being created in the first positive frame 17a. Negative image 15a will be exposed on positive frame 17a at one-half the normal intensity. Then, as shown in FIG. 4, the negative 11 will be advanced forward one frame. Light 19 will then transmit the second negative image 15b onto the first positive frame 17a, again at one-half the exposure rate. The two images 15a and 15b will be exposed at one-half the normal exposure rate, totalling the full exposure rate for the frame 17a.

Figure 5:
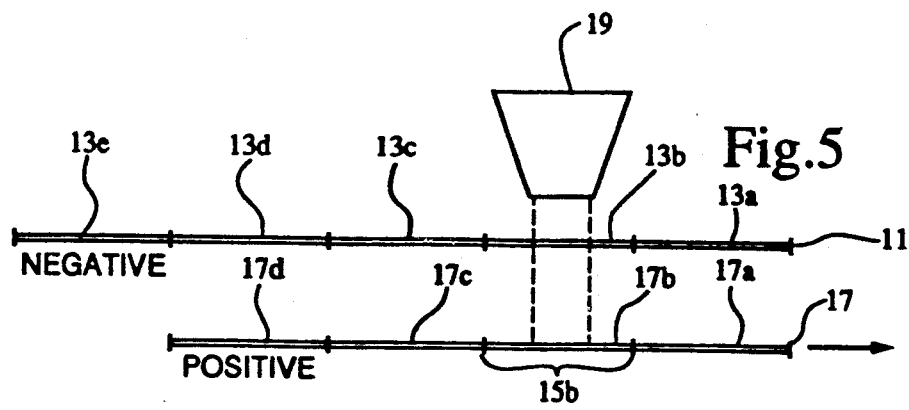
Figure 6:
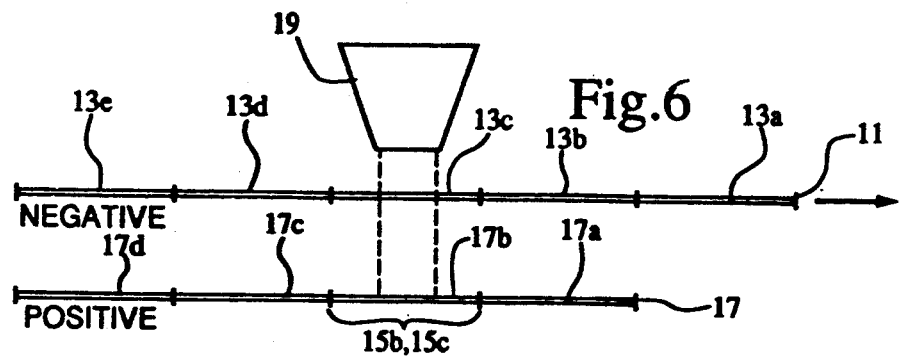

Then, the positive 17 will be advanced forward one frame. As shown in FIG. 5, this exposes the second negative frame image 15b onto the second positive frame 17b. Then, as shown in FIG. 6, the negative 11 will be advanced forward one frame relative to the positive 17. The third negative image 15c will be superimposed onto the second negative image 15b in the second positive frame 17b. The exposure rates again will be one-half that of the normal exposure rate.

Figure 7:
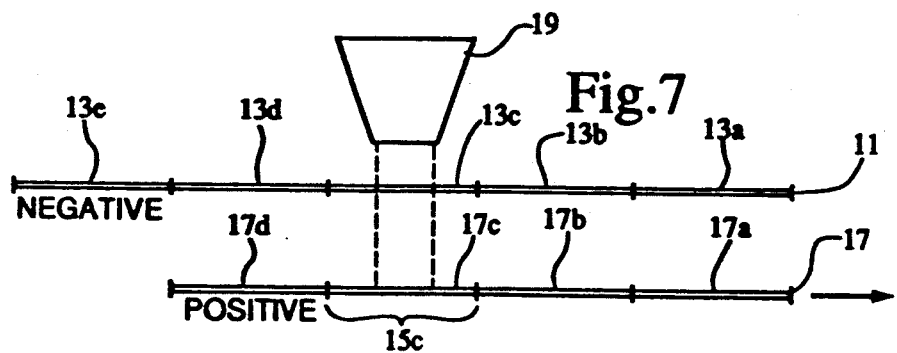

Then, in like manner, as shown in FIG. 7, the positive 17 will be advanced one frame forward. The third negative image 15c will be exposed onto the positive frame 17c. The steps will then continue until the processing of the positive 17 has been completed.

Figure 8:
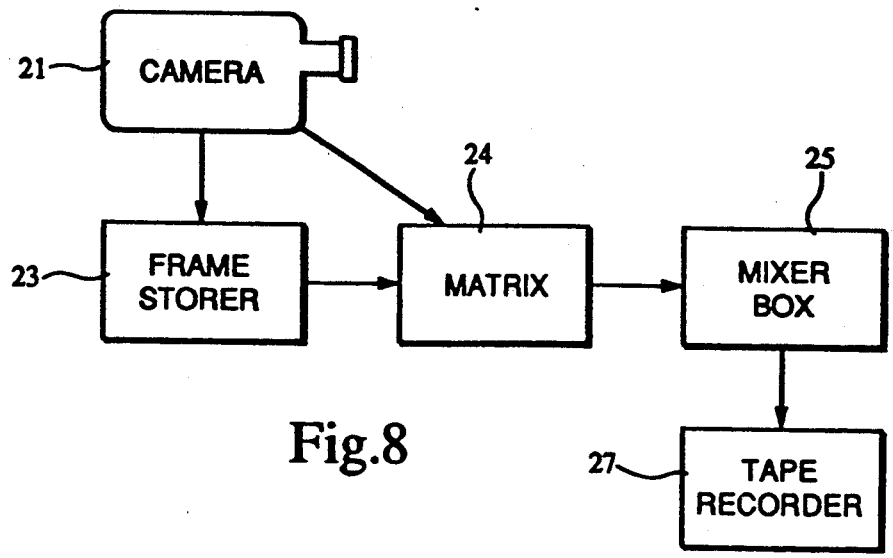
FIG. 8 is a block diagram illustrating a method of creating a video tape in accordance with this method.

Referring to FIG. 8, the same procedure can be applied to video tape, which will also be referred to herein as "film". In this procedure, a video camera 21 will be aimed at an image for sensing the appearance of the image and converting it into a plurality of electronic frames. Each frame contains a plurality of electronic lines. The frames represent incremental time periods. Typically, the frames will be recorded at thirty frames-per-second. The camera 21 will not store any of these frames during the photographing, rather it will be continuously providing electrical signals as a result of the scanning. Camera 21 is conventional. It could be scanning actual motion in live filming. Also, ti could be converting a previously recorded film that will be shown in front of it. This previously recorded film can be either photographic emulsion film or video tape.

Camera 21 will be connected to a frame-storer 23. Frame-storer 23 is a conventional time. Frame-storer 23 is capable of delaying the signals from camera 21 for one frame period. That is, it will store a frame for the time duration of a frame, then transmit it on. A company known as Ampex and located in Sunnyvale, Calif. manufactures a frame-storing device of this nature. In the prior art, the frame-storing device is typically used to synchronize different feeds, such as one from a satellite and another from another source.

Frame-storer 23 connects to a matrix circuit 24. Matrix circuit 24 is a conventional resistive network and could be incorporated into the frame-storer 23. It reduces incoming signals by approximately one-half the amplitude, thus effectively halving the exposure rate. Camera 21 is also directly connected to the matrix circuit 24. The output of camera 21 thus passes directly to both the frame-storer 23 and to the matrix circuit 24. The two signals received by the matrix circuit 24 are reduced in exposure rate by one-half.

The output of matrix circuit 24 leads to a mixer box or circuit 25. Matrix circuit 24 could be incorporated as a portion of the mixer box 25. Mixer box 25 is also conventional. It is capable of mixing two incoming signals into a composite signal. That is, it will mix two frames together to provide a superimposed or double exposed frame. The third frame will be a superimposition of both of the other two frames. These types of devices have been used in the past. One firm known as Cohu, Inc. in San Diego, Calif. manufactures such a mixer, also called "mixer/switcher". In the prior art, mixers are used typically to switch from one video camera to another video camera and to mix signals during the transmission.

The output of mixer box 25 leads to a tape recorder 27. Tape recorder 27 is also conventional. It receives the incoming signals from the mixer box 25 and records them on a video tape.

In the operation of the video processing method, as illustrated in FIG. 8, the video camera 21 will first transmit a first frame to the frame-storer 23, which serves as a frame delay circuit. Then, camera 21 will transmit the second frame to the frame-storer 23 and also simultaneously to the matrix 24. Simultaneously, the frame-storer 23 transmits the first frame to the matrix 24. This results in the first frame and the second frame of the video camera being in the matrix circuit 24 at the same time.

Matrix circuit 24 reduces the amplitude of each signal by approximately one-half and passes the signals representing the first and second frames to the mixer box 25. The first and second frames will be conventionally mixed by the mixer box 25 into a composite signal. This signal is transmitted to the tape recorder 27. The tape recorder 27 will record a first frame on video tape. This first frame will have images of the first and second frames of camera 21.

Camera 21 transmits a third frame of the video camera to the frame-storer 23 and matrix 24. Simultaneously with that transmittal, the frame-storer 23 will transmit the second frame to the matrix 24. The second and third frames will be reduced in amplitude and mixed in the mixer box 25. The mixer box 25 transmits the mixed second and third frames to the tape recorder 27. Tape recorder 27 creates a second frame on the video tape. The second frame will have images from the second and third frames recorded by the video recorder 21. The procedure will be repeated until the video tape has been completely processed.

The invention has significant advantages. The dual images on the frames will reduce the sharpness of the image, thus reducing the strobing effect. The film will have a greater resolution and greater density because of the superimposition of two separate frames in a single frame.

While the invention has been shown in only one of its forms, it should be apparent to those skilled in the art that it is not so limited, but is susceptible to various changes without departing from the scope of the invention.

I claim:

1. A method of processing video tape, comprising:
  (a) scanning images with a video camera and continuously converting the images scanned into a plurality of frames, each frame containing a plurality of electronic lines;
  (b) delaying the first frame scanned by the video camera by conveying the first frame to a frame-delay circuit;
  (c) transmitting a second frame scanned by the video camera to the frame-delay circuit, transmitting the first frame from the frame-delay circuit and then combining the second frame with the first frame; then
  (d) recording with a video recording device the combined first and second frames onto a first frame of a video tape, creating a combined frame on the first frame of the video tape; then
  (e) repeating steps (a) through (d) for second and succeeding frames until a selected amount of the video tape is processed.

2. The method according to claim 1, further comprising reducing the exposure rate of each of the first and second frames prior to recording the first and second frames on the first frame of the video tape.

3. A method of processing motion video tape, comprising:
  (a) scanning images with a video camera and continuously converting the images scanned into a plurality of frames, each frame containing a plurality of electronic lines;
  (b) conveying a first frame scanned by the video camera to a frame-delay circuit;
  (c) transmitting a second frame scanned by the video camera simultaneously to a resistive network circuit and to the frame-delay circuit;
  (d) simultaneously with step (c), conveying the first frame scanned by the video camera from the delay circuit to the resistive network circuit;
  (e) reducing the exposure rate of the first and second frames in the resistive network circuit by approximately one-half the exposure rate as scanned previously by the camera;
  (f) conveying the first and second frames from the resistive network circuit to a mixing circuit, combining the first and second frames with the mixing circuit and conveying the combined first and second frames to a recording device; then (g) recording with the video recording device the combined first and second frames onto a first frame of a video tape, creating a combined frame; then (h) conveying a third frame scanned by the video camera simultaneously to the resistive network circuit and to the frame delay circuit;

(i) simultaneously with step (h), conveying the second frame scanned by the video camera from the frame-delay circuit to the resistive network circuit;

(j) reducing the exposure rate of the second and third frames in the resistive network circuit by approximately one-half the exposure rate as scanned previously by the camera;

(k) forwarding the second and third frames from the resistive network circuit to a mixing circuit, combining the second and third frames with the mixing circuit and conveying the combined second and third frames to the recording device; then (l) recording with the video recording device both the second and third frames onto a second frame of the video tape, creating a combined frame; then (m) repeating steps (a) through (l) until a selected amount of the video tape is processed.

* * * * *